United States Patent
Murphy

(10) Patent No.: US 9,218,420 B1
(45) Date of Patent: Dec. 22, 2015

(54) DETECTING NEW BUSINESSES WITH UNRECOGNIZED QUERY TERMS

(71) Applicant: Google Inc., Mountain View, CA (US)

(72) Inventor: Bruce Winston Murphy, Sydney (AU)

(73) Assignee: GOOGLE INC., Mountain View, CA (US)

( * ) Notice: Subject to any disclaimer, the term of this patent is extended or adjusted under 35 U.S.C. 154(b) by 78 days.

(21) Appl. No.: 13/777,476

(22) Filed: Feb. 26, 2013

(51) Int. Cl.
G06F 17/30 (2006.01)

(52) U.S. Cl.
CPC .................. G06F 17/30864 (2013.01)

(58) Field of Classification Search
CPC ............ G06F 17/30864; G06F 17/30038
USPC .......................................... 707/706
See application file for complete search history.

(56) References Cited

U.S. PATENT DOCUMENTS

| | | | |
|---|---|---|---|
| 2004/0199496 A1 | 10/2004 | Liu et al. | |
| 2004/0204958 A1* | 10/2004 | Perkins et al. | 705/1 |
| 2005/0234972 A1* | 10/2005 | Zeng et al. | 707/103 R |
| 2007/0244634 A1 | 10/2007 | Koch et al. | |
| 2008/0091443 A1* | 4/2008 | Strope et al. | 705/1 |
| 2008/0114721 A1 | 5/2008 | Jones et al. | |
| 2009/0077047 A1 | 3/2009 | Cooper et al. | |
| 2009/0083255 A1* | 3/2009 | Li | 707/5 |
| 2009/0089261 A1 | 4/2009 | Leher et al. | |
| 2009/0234853 A1* | 9/2009 | Gupta et al. | 707/6 |
| 2009/0287691 A1* | 11/2009 | Sundaresan et al. | 707/5 |
| 2010/0146397 A1* | 6/2010 | Koch et al. | 715/739 |
| 2010/0198857 A1 | 8/2010 | Metzler et al. | |
| 2010/0205173 A1 | 8/2010 | Carnahan | |
| 2011/0047139 A1* | 2/2011 | Strope et al. | 707/706 |
| 2012/0166416 A1* | 6/2012 | Murdock et al. | 707/711 |
| 2012/0191717 A1 | 7/2012 | Chen et al. | |
| 2012/0209836 A1* | 8/2012 | Virdy | 707/724 |
| 2013/0103696 A1 | 4/2013 | Wu et al. | |
| 2013/0110830 A1* | 5/2013 | Vadlamani | 707/730 |
| 2013/0317883 A1* | 11/2013 | Becker et al. | 705/7.29 |
| 2014/0129625 A1* | 5/2014 | Haugen et al. | 709/204 |
| 2014/0358971 A1* | 12/2014 | Aminzade et al. | 707/780 |

* cited by examiner

*Primary Examiner* — Apu Mofiz
*Assistant Examiner* — Jared Bibbee
(74) *Attorney, Agent, or Firm* — Marshall, Gerstein & Borun LLP

(57) ABSTRACT

Provided is a process for identifying a new business listing, the process including: identifying, from a log of local search queries, a term that does not correspond to a name of a business listing; determining a number of recent search queries containing the term and a number of historical search queries containing the term; determining that a rate based on the number of recent search queries exceeds a threshold rate based on the number of historical search queries; and identifying the term as a name of a new business listing.

18 Claims, 3 Drawing Sheets

DETECTING NEW BUSINESSES WITH UNRECOGNIZED QUERY TERMS

BACKGROUND OF THE INVENTION

1. Field of the Invention

The present invention relates generally to business listings and, more specifically, to augmenting business listings to include new businesses.

2. Description of the Related Art

Business listings are generally useful for, among other things, responding to queries about listed businesses and geocoding documents that mention such businesses. However, it is expensive to maintain a listing of businesses. Such a listing quickly becomes outdated as new businesses open, and traditional techniques of identifying such changes are expensive, often requiring surveyors to manually canvas a large geographic area to identify the relatively small portion of business in the area that are new.

SUMMARY OF THE INVENTION

The following is a non-exhaustive listing of some aspects of the present techniques. These and other aspects are described in the following disclosure.

Some aspects include a process for identifying a new business listing, the process including: identifying, from a log of local search queries, a term that does not correspond to a name of a business listing; determining a number of recent search queries containing the term and a number of historical search queries containing the term; determining that a rate based on the number of recent search queries exceeds a threshold rate based on the number of historical search queries; and identifying the term as a name of a new business listing.

Some aspects include a tangible, non-transitory, machine-readable medium storing instructions that when executed by a data processing apparatus cause the data processing apparatus to perform operations, including: identifying, from a log of local search queries, a term that does not correspond to a name of a business listing; determining a number of recent search queries containing the term and a number of historical search queries containing the term; determining that a rate based on the number of recent search queries exceeds a threshold rate based on the number of historical search queries; and identifying the term as a name of a new business listing.

Some aspects include a system, including one or more processors, and memory storing instructions that when executed by the processors cause the processors to effectuate operations including: identifying, from a log of local search queries, a term that does not correspond to a name of a business listing; determining a number of recent search queries containing the term and a number of historical search queries containing the term; determining that a rate based on the number of recent search queries exceeds a threshold rate based on the number of historical search queries; and identifying the term as a name of a new business listing.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
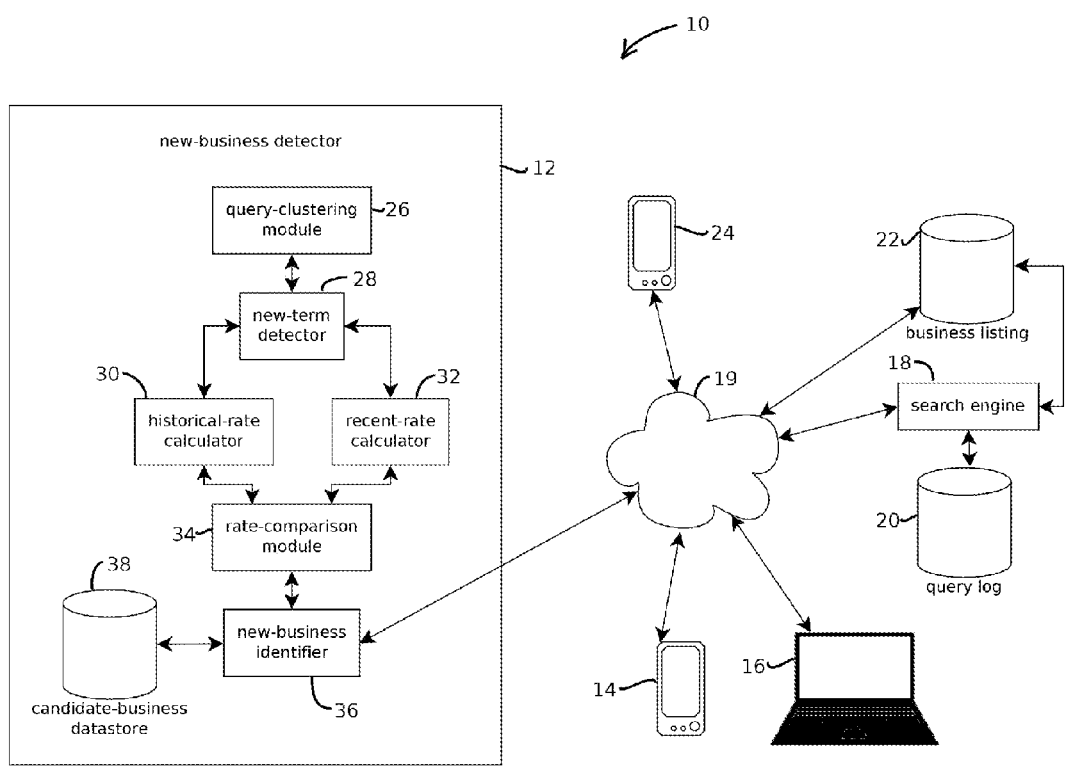
FIG. 1 shows an example of a new-business detector and the environment in which the detector operates.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

Embodiments monitor query logs for unrecognized business names, which signal that a new business is likely extant and needs to be added to a business listing. Query logs, however, present a relatively noisy signal from users, as some unrecognized queries are misspellings of known businesses, while others correspond to a new business. To mitigate this noise, embodiments exploit the tendency of misspellings to remain generally constant in frequency over time, while a new business tends to cause an uptick in the rate of occurrence of a corresponding string, such as the business's name, in queries. Thus, to identify new businesses, embodiments establish a baseline for a given unrecognized term (e.g., a word or sequence of words) and, if that term exhibits a sudden increase from the baseline, it is identified as a likely new business. This automatically-generated lead is then fed to a work-list for a surveyor, who manually investigates further to confirm that a new business exists and should be added to the listing. Along with the lead, the surveyor is presented with clues regarding the likely location of the business based on recognized portions of the query corresponding to location (e.g., a street name) and based on context in which queries were submitted (e.g., a viewport of an interactive map or location of the user's device). To improve accuracy, some embodiments geolocate the submitted queries, cluster them, and detect spikes in each cluster, causing new local businesses to stand out in sharper relief relative to the latent rate of misspellings.

For instance, a search engine may receive queries including the unrecognized term "samwichs," e.g., "samwichs restaurant," samwichs 327 Main st.," and "samwichs near mountanview." The search engine, of this example, verifies that the term "samwichs" does not correspond to a know business listing, and in some cases, presents the user with a spell-corrected version of search results, e.g., based on "sandwiches near mountaview," or the search query, corresponding to a known sandwich shop in a business listing. In this example, the rate with which the term "samwhichs" appears in queries is generally constant, e.g., 1/100,000 queries or once every 2 days, plus-or-minus around 20%, in this hypothetical example. However, were a new business named "Samwichs" to open, queries including this string will be submitted at a much higher rate, e.g., 1/20,000 queries or once every hour. Embodiments detect this change in rate and flag the term as likely being a name of a new business. Further, some embodiments present the term and candidate locations inferred from the queries, e.g., 327 Main St. in Mountainview, to a surveyor, so the new business can be confirmed with relatively little effort.

FIG. 1 shows an example of a computing environment 10 in which a new-business detector 12 operates to detect new businesses. The arrival of a new business is signaled by unrecognized terms occurring in queries submitted by user devices 14 or 16 to search engine 18 via the Internet 19. These queries are stored in a query log 20 for subsequent analysis by the new-business detector 12 to augment a business listing 22. In some embodiments, the new businesses are presented on a mobile device 24 carried by a human reviewer in the field who confirms the existence of the new business before the business is added to the listing 22.

End-users query the search engine 18 via any of a variety of different interfaces on the user devices 14 or 16, including an interactive map having a query input, a text input in a search engine website, and via spoken queries conveyed to search engine 18 for transcription into text queries. Examples of end-user devices 14 and 16 are described below with reference to FIG. 3. The submitted queries, in some cases, include additional context, for instance a geolocation sensed by the mobile devices 14 or 16, a map extent being displayed by the mobile devices 14 or 16, and a IP address of the devices 14 or 16.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used.

The search engine 18 maintains an index of resources for answering these queries. In some cases, the query is submitted by the search engine 18 to the business listing 22 to determine whether a business in the listing is responsive to part of the query and indicate which part of the query is likely a business name. The business listing 22 includes names of businesses and, in some cases, locations of businesses. In some cases, some terms in the query do not match an entry in the business listing 22, in which case, the search engine 18 stores the query in the query log 20 along with a timestamp of the query, and a geolocation of the query.

Queries are geolocated based on the above-described context information. For example, queries are geolocated to a location known to match the IP address of the user device 14 or 16 from which the query was received; queries are geolocated to a area of a map being displayed on the user devices 14 or 16; or queries are geolocated to locations identified in the submitted query, as occurs when a query includes the name of the city or street along with the name of a new business.

In some embodiments, the search engine 18 is operative to suggest a spell-corrected version of the query to the user when a new term is detected. In some cases, when the user misspells their query, and the user selects the spelling-corrected version, this selection is noted in the query log 20 (or the record in the log 20 is removed) as having been confirmed as a misspelling, rather than a query including the name of a new business. These query records are made available to the new-business detector 12.

In this embodiment, the new-business detector 12 includes a query-clustering module 26, a new-term detector 28, a historical-rate calculator 30, a recent-rate calculator 32, a rate-comparison module 34, a new-business identifier 36, and a candidate-business data store 38. These components communicate with one another to acquire queries and associated data from the query log 20, identify increases in the rate at which unrecognized terms occur, and flag those terms in the candidate-business data store 38 as names of new businesses to be investigated for addition to the business listing 22.

The query-clustering module 26 obtains the query records from the query log 20 and groups the query records by geographic location to form logs of local search queries. Geographic bins for grouping the queries may be predefined, for example by ZIP code, city, state, or an arbitrary grid, or geographic bins may be dynamically determined by clustering the geographic locations according to, for example, a k-means clustering algorithm. Some (or all) query records, as noted above, include a geographic location determined by the search engine 18 based on context information or geographic terms in the query. The output of the query-clustering module 26 is a plurality of logs of local search queries, each log containing one group of geographically clustered query records. Grouping the queries by location helps isolate signal from noise, as new businesses tend to start in a single location, and the local query log having that location exhibits a relatively large increase in the occurrence rate of the businesse's name relative to coincidental misspellings.

The local query logs are input to the new-term detector 28, which identifies in each log new terms that are absent from the business listing 22. In some embodiments, stopwords and words known to refer to things other than businesses—e.g., adjectives, like the term "near," or names of geographic features (such as cities and streets)—are removed from the set of unrecognized terms. The new-term detector 28, in some cases, operates within the search engine 18, and new terms are associated with a query record in the query log 20 before being grouped geographically. Alternatively, for each local query log, the new term detector 28 submits each query in the log to the business listing 22, which identifies the terms in the query absent from the business listing 22. For each identified new term, in this example, the new-term detector 28 outputs a new-term record, each record including an identifier of the local query log in which the term was detected, the query records in the log having the term, and the term itself.

The new-term records are input to both the historical-rate calculator 30 and the recent-rate calculator 32, which each measure the rate with which new terms are used in the local queries, but over differing time spans. For each new term record, in this example, the recent-rate calculator 32 measures the rate over a relatively short trailing duration from the current time, and the historical-rate calculator 30 measures the same property over longer time spans.

In some embodiments, the historical rate is characterized by a measure of central tendency (e.g., a mean, median, mode, etc.) and a measure of variability (e.g., standard deviation, max-to-min range, or variance). To this end, the historical-rate calculator 30 bins the query records at issue (i.e., those in a given new-term record) according to timestamps of the queries, for instance by month or year, and the mean (or other measure of central tendency) and standard deviation (or other measure of variance) of the rate across the bins is calculated to quantify the distribution of the rate over time. Thus, some embodiments of the historical-rate calculator 32 output for each new-term record a mean rate of occurrence of the term and a standard deviation of the rate of occurrence of the term.

Also for each new term record, the recent-rate calculator 32 of this embodiment selects those query records of less than a threshold age, such as those having a timestamp within the previous seven days, previous 30 days, or previous three months, depending upon the desired responsiveness and acceptability of errors. In some cases, the threshold age is selected based on the variability of the historical rate and the sample size to increase the likelihood of a statistically significant signal being detected, such that smaller sample sizes and greater variability result in older threshold ages. The selected queries are counted to determine the number of recent local search queries containing the corresponding term and a rate of occurrence, either explicitly by dividing the number of recent search queries by the amount of time in the trailing duration, or implicitly by using a fixed trailing duration such that the count consistently corresponds with the rate. The calculated recent rate of occurrence of each term is advanced to the rate-comparison module 34, along with the corresponding new-term record.

In some embodiments, the historical rate and recent rate are normalized according to the total number of queries (either in the local area or without regard to area), e.g., by dividing the rates by the total for a corresponding time-bin or trailing duration. Normalizing the rates is helpful for analyzing queries of search engines that experience uneven rates of query submission, e.g., seasonal variation or growth in the user base. Otherwise, the increase in all query submissions could cause the recent rate for a potential new term to appear higher than the historical rate for reasons other than the arrival of a new business.

The rate-comparison module 34 compares the outputs of the calculators 30 and 32 to identify instances in which the recent rate of usage of a unrecognized term exceeds the expected range indicated by the historical-rate calculator 30 in a local query log. To this end, in some embodiments, the rate-comparison module 34 determines whether the recent rate exceeds a threshold rate that is some number of standard deviations, e.g., approximately two, three, or four, above the mean historical rate. Or in some embodiments, the threshold rate is a predetermined amount above, or percentage of (e.g., 150%), the historical rate. Upon determining that the recent rate has exceeded this threshold, the corresponding new-term record is advanced to the new-business identifier 36, along with, in some cases, a confidence score based on the amount by which the recent rate exceeds the threshold. Otherwise, the term in question is disregarded from further analysis as likely arising from misspellings.

To detect smaller, but persistent increases in usage of a business name, some embodiments calculate multiple recent rates, each corresponding to a different trailing duration (e.g., a one-week rate, a one month rate, and a six month rate). Each of these recent rates has a different corresponding rate threshold relative to the historical rate, with lower thresholds applied to the recent rates measured over longer periods of time. Thus, a persistent but smaller increase that is not detected using the one-week rate may be detected by comparing the six-month rate to a smaller threshold over the historical rate. Using multiple recent rates in this manner alleviates some of the trade-offs that would otherwise be made between responsiveness and the risk of errors. If any of the recent rates indicate a new term, the new-term recored is input to the new-business identifier 36.

The new-business identifier 36 identifies the term as the name of a new business, either in the candidate-business data store 38 or in the business listing 22, depending upon the embodiment. In some cases, the new term is added directly to the business listing 22 along with an associated geographic location indicated by queries including the term, for example those queries determined to have a street address that is the same in more than a threshold number of queries including the term. Or some embodiments add the term to the candidate-business data store 38 for confirmation using other sources of information, e.g., human review. In some cases, confirmation is sought only for those new terms for which the confidence score is less than a threshold or for which the geographic location is insufficiently specified by context in the query records.

New terms may be confirmed as new businesses with a variety of techniques. Confirmation is secured automatically, in some embodiments, by submitting a query from the new-business identifier 36 to the search engine 18 requesting reviews that mention a new business of the identified name. The term is confirmed by determining that more than a threshold number of reviews exist. Or confirmation may be secured manually by adding the name of the candidate new business to a work list for a human reviewer. In some cases, the work list is transmitted to the mobile device 24, and each new business is presented along with a likely geographic location of the business inferred from the context of the queries and an interface by which the human reviewer indicates whether the new business is extant. The human reviewer visits the identified geographic locations for each item on the work list and confirms the new business, in which case the new-business identifier 36 adds the new business to the business listing 32, either with the inferred location of the business, or a corrected location provided by the human reviewer.

Thus, embodiments update the business listing 22 at relatively low cost, with relatively little effort on the part of human reviewers, who would otherwise likely canvas a geographic area looking for new businesses. The new businesses are identified and added to the listing, either automatically, or manually while focusing the human reviewer on relatively strong candidates for new businesses, thereby reducing the amount of effort consumed updating the business listing 22.

The components of the new-business detector 12 are illustrated as discrete functional blocks. But it should be noted that the software or hardware by which these functional blocks are implemented may be arranged differently from what is illustrated in FIG. 1. For instance, such code or hardware may be conjoined, intermingled, subdivided, distributed, or otherwise differently arranged. Code for providing the functionality described herein may be stored on a tangible, non-transitory, machine-readable medium such that when the code is executed by a data processing apparatus, the data processing apparatus effectuates the operations described herein. Similarly, one or more instances of the computer system described below with reference to FIG. 3 may execute such code stored in memory of the computer system with one or more processors of the computer system to provide the functionality described herein.

Figure 2:
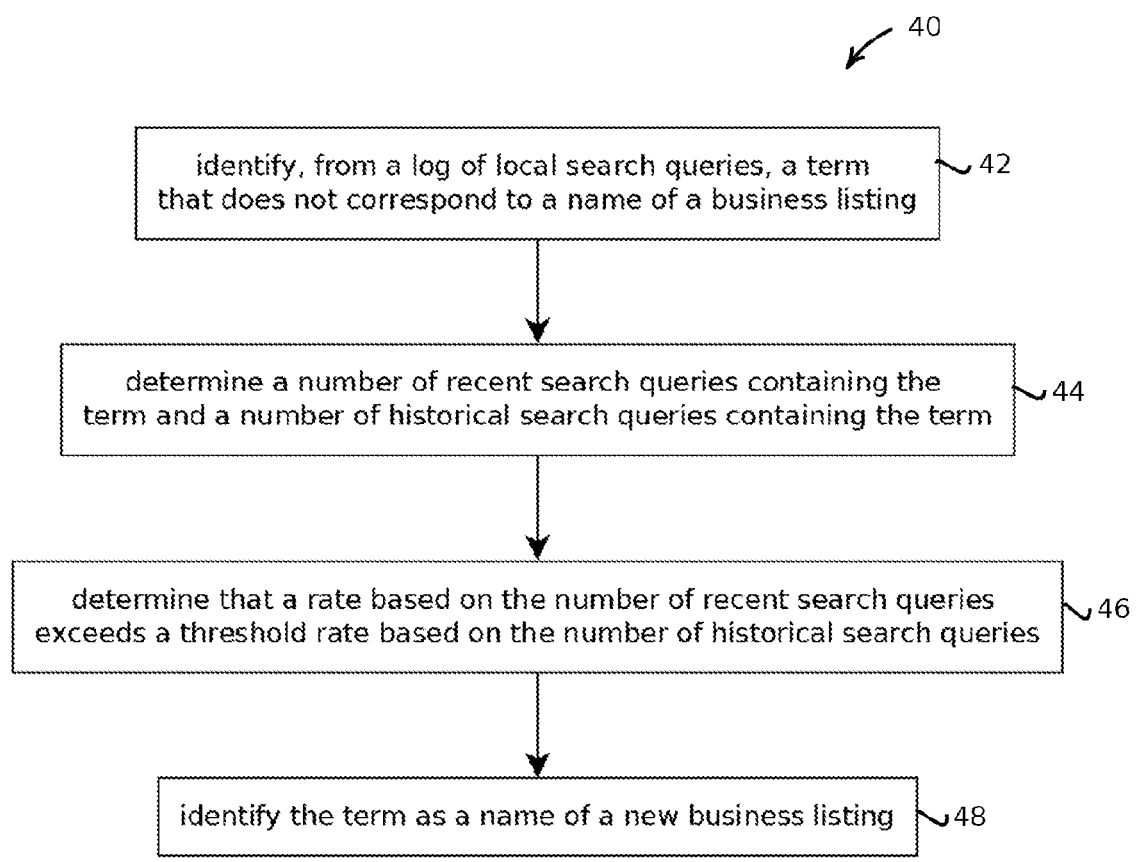
FIG. 2 shows an example of a process for detecting new businesses.

FIG. 2 illustrates an example of a process 40 for detecting new businesses. The process 40, in some embodiments, is performed by the above-described new-business detector 12, but is not limited to the particulars of that embodiment. In this example, the process 40 includes identifying, from a log of local search queries, a term that does not correspond to a name of a business listing, as indicated by block 42. This step, in some cases, is performed by the above-described query-clustering module 26 and new-term detector 28, or this term may be performed by the above-described search engine 18. Next in this example, process 40 includes determining a number of recent search queries containing the term and a number of historical search queries containing the term, as indicated by block 44. This step, in some embodiments, is performed by the recent-rate calculator 32 and the historical-rate calculator 30 of FIG. 1. Illustrated process 40 further includes determining that a rate based on the number of recent search queries exceeds a threshold rate based on the number of historical search queries, as indicated by block 46. This step, in some embodiments, is performed by the above-described rate-comparison module 34. Finally in this example, process 40 includes identifying the term as a name of a new business listing, as indicated by block 48. This step is performed by the new-business identifier 36 of FIG. 1. Thus, process 40 detects the presence of new businesses based on changes in the rate with which a name of a new business occurs in search queries and, in response, updates a business listing.

Figure 3:
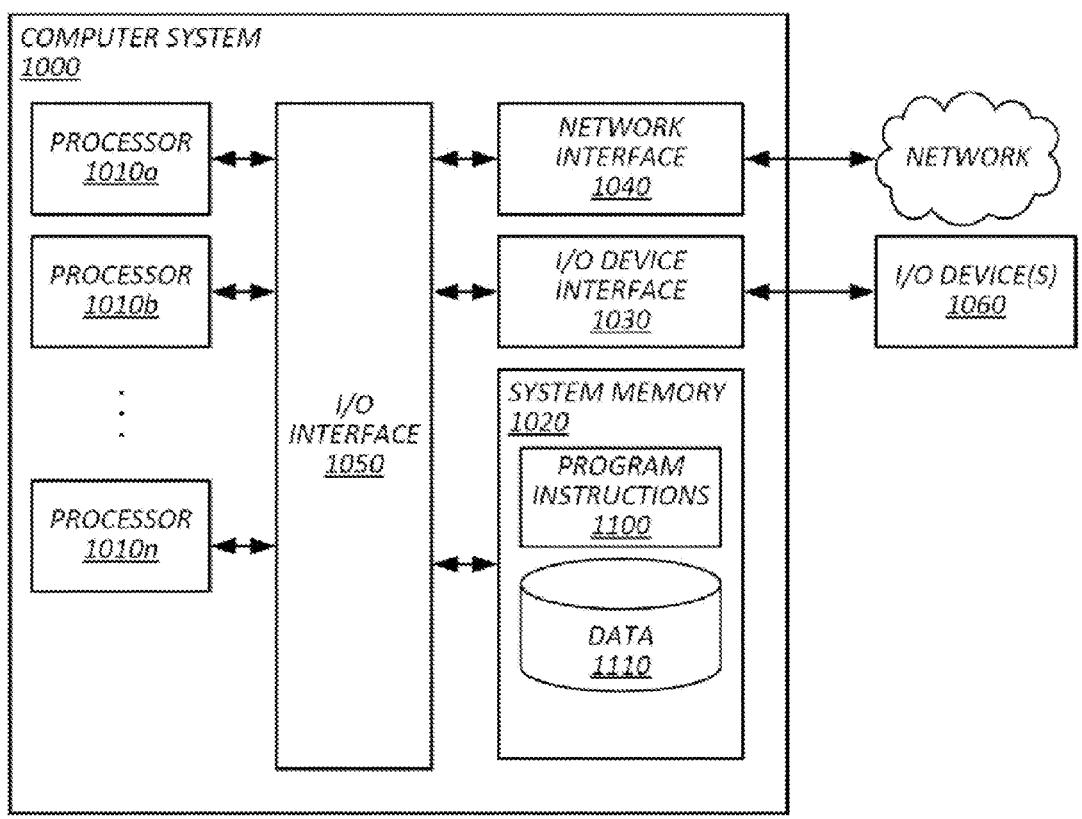
FIG. 3 shows an example of a computer by which embodiments are implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A method for identifying a new business listing, comprising: acquiring a log of local search queries submitted by users; identifying, from the log of local search queries, a term that does not correspond to a name of a business listing; determining a number of recent search queries containing the term and a number of historical search queries containing the term; determining a threshold rate based on the number of historical search queries; determining that a rate based on the number of recent search queries exceeds the threshold rate based on the number of historical search queries; and identifying the term as a name of a new business listing; and searching reviews of new businesses for the term in response to identifying the term as a name of a new business; determining that the name appears in the reviews; and identifying the term as being confirmed as a new business.

2. The method of claim 1, wherein the term is identified from a log of local search queries in a particular geographic area, and the number of recent search queries and the number of historical search queries are obtained from the particular geographic area.

3. The method of claim 1, wherein identifying, from the log of local search queries, a term that does not correspond to a name of a business listing comprises: filtering from a larger set of search queries those search queries for which a user selected a proposed spelling corrected query.

4. The method of claim 1, wherein identifying, from the log of local search queries, a term that does not correspond to a name of a business listing comprises: clustering the search queries according to a geographic location associated with each search query; and identifying, from one of the clusters, a term that does not correspond to a name of a business listing.

5. The method of claim 1, wherein identifying the term as a name of a new business listing comprises: adding the term to a work-list of likely new businesses for human review; and receiving a confirmation following review that the term corresponds to a new business.

6. The method of claim 5, wherein adding the term to a work-list of likely new businesses for human review comprises: associating with the term a geographic area selected based on the local search queries containing the term.

7. The method of claim 1, wherein the threshold rate is dynamically selected based on a variability of a historical rate such that higher variability causes the threshold rate to increase.

8. The method of claim 1, wherein identifying the term as a name of a new business listing comprises: associating with the name a geographic area defined by geographic locations indicated by the local search queries.

9. The method of claim 8, wherein the geographic locations are indicated by a geocoding an IP address from which the queries were received, a map extent displayed in a viewport of a interactive map with which the queries were received, or other terms appearing in the queries corresponding to geographic locations.

10. The method of claim 1, wherein the historical rate is based on non-local queries associated with a larger geographic area than the log of local search queries.

11. The method of claim 1, comprising assigning a priority to the term according to a difference between the rate based on the number of recent search queries and the threshold rate.

12. The method of claim 1, wherein the threshold rate is selected determined based on a variance of a rate of historical search queries with the term and a measure of central tendency of the rate of historical search queries with the term.

13. The method of claim 1, wherein the threshold rate is more than two standard deviations greater than the mean rate of historical search queries with the term.

14. The method of claim 1, wherein determining that a rate based on the number of recent search queries exceeds a threshold rate based on the number of historical search queries comprises: normalizing a recent rate and a historical rate according to a total number of queries received during respective corresponding time periods.

15. The method of claim 1, wherein determining that a rate based on the number of recent search queries exceeds a threshold rate based on the number of historical search queries comprises: calculating multiple recent rates each corresponding to queries of less than a different age; and determining whether any of the recent rates exceeds a corresponding threshold historical rate, wherein the threshold historical rates for recent rates of a longer sampling period is lower than the threshold historical rates for recent rates of a shorter sampling period.

16. The method of claim 1, comprising: adding the term to the business listing; and displaying sending advertisements for display along with information from the business listing.

17. A tangible, non-transitory, machine-readable medium storing instructions that when executed by a data processing apparatus cause the data processing apparatus to perform operations comprising: acquiring a log of local search queries submitted by users; identifying, from the log of local search queries, a term that does not correspond to a name of a business listing; determining a number of recent search queries containing the term and a number of historical search queries containing the term; determining a threshold rate based on the number of historical search queries; determining that a rate based on the number of recent search queries exceeds the threshold rate based on the number of historical search queries; and identifying the term as a name of a new business listing; and sending the term to a mobile device for confirmation that the new business is extant by a user; receiving from the mobile device the confirmation; and identifying the term as being confirmed as a new business.

18. A system, comprising: one or more processors; and memory storing instructions that when executed by the processors cause the processors to effectuate operations comprising: acquiring a log of local search queries submitted by users; identifying, from the log of local search queries, a term that does not correspond to a name of a business listing; determining a number of recent search queries containing the term and a number of historical search queries containing the term; determining a threshold rate based on the number of historical search queries; determining that a rate based on the number of recent search queries exceeds the threshold rate based on the number of historical search queries, including: calculating multiple recent rates each corresponding to queries of less than a different age; and determining whether any of the recent rates exceeds a corresponding threshold historical rate, wherein the threshold historical rates for recent rates of a longer sampling period is lower than the threshold historical rates for recent rates of a shorter sampling period; and identifying the term as a name of a new business listing.

* * * * *